(12) United States Patent
Sogutcu et al.

(10) Patent No.: US 10,053,900 B2
(45) Date of Patent: Aug. 21, 2018

(54) CENTER TRACK DESIGN FOR A SLIDING DOOR (71) Applicant: Ford Global Technologies, LLC, Dearborn, MI (US)

(72) Inventors: Ceyhun Sogutcu, Dearborn, MI (US); Aytug Ulker, Dearborn, MI (US); Sabri Ilksoz, Dearborn, MI (US); Hakan Kesgin, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/416,208

(22) Filed: Jan. 26, 2017

(65) Prior Publication Data

US 2017/0211306 A1    Jul. 27, 2017

(30) Foreign Application Priority Data

Jan. 27, 2016  (EP) ..................................... 16152857

(51) Int. Cl.
*F16C 29/02* (2006.01)
*E05D 15/06* (2006.01)
(Continued)

(52) U.S. Cl.
CPC ............ *E05D 15/0608* (2013.01); *B60J 5/06* (2013.01); *F16C 29/02* (2013.01);
(Continued)

(58) Field of Classification Search
CPC ...... F16C 29/02; F16C 33/02; F16C 2326/01; E05D 15/0608; E05D 2015/1055; E05D 15/1047; E05Y 2201/684; E05Y 2600/62; E05Y 2600/634; E05Y 2900/531; B60J 5/06
(Continued)

(56) References Cited

U.S. PATENT DOCUMENTS 400,562 A      4/1889  Goelet
3,453,778 A *  7/1969  Daugirdas ............ B61D 19/008
                                                            49/214
(Continued)

FOREIGN PATENT DOCUMENTS

DE        2427334 A1 *  1/1975  ......... E05D 15/1044
DE    102009058583 A1     6/2011
(Continued)

*Primary Examiner* — Marcus Charles
(74) *Attorney, Agent, or Firm* — Jason Rogers; Prince Heneveld LLP (57) ABSTRACT

A sliding door mounting system for a vehicle includes a center track configured to support a sliding door between open and closed positions. The center track member includes a first zone and a second zone with a first bend disposed therebetween at a first angle. The center track member further includes a third zone and a second bend disposed between the second zone and the third zone at a second angle. A support part includes first and second zones and a portion of the center track member is coupled to an outer surface of the support part. The first zone of the support part includes a first thickness, and the second zone of the support part includes a second thickness. The second thickness of the second zone increases from a first end to a second end thereof.

20 Claims, 5 Drawing Sheets (51) Int. Cl.
*B60J 5/06* (2006.01)
*F16C 33/02* (2006.01)
*E05D 15/10* (2006.01)

(52) U.S. Cl.
CPC .. *E05D 15/1047* (2013.01); *E05D 2015/1055* (2013.01); *E05Y 2201/684* (2013.01); *E05Y 2600/62* (2013.01); *E05Y 2600/634* (2013.01); *E05Y 2900/531* (2013.01); *F16C 2326/01* (2013.01)

(58) Field of Classification Search
USPC ............ 384/7, 26, 36, 42; 296/146.1, 146.5, 296/146.9, 155
See application file for complete search history.

(56) References Cited

U.S. PATENT DOCUMENTS

| | | | | |
|---|---|---|---|---|
| 4,447,095 | A | * | 5/1984 | Fielding .............. A47B 88/487 312/334.18 |
| 6,328,374 | B1 | | 12/2001 | Patel |
| 2005/0039404 | A1 | * | 2/2005 | Mrkovic .............. E05B 381/20 49/360 |
| 2005/0150170 | A1 | | 7/2005 | Lahnala |
| 2006/0225358 | A1 | * | 10/2006 | Haag .................... H02K 7/1166 49/360 |
| 2009/0230721 | A1 | * | 9/2009 | Rusnak ................. E05D 15/101 296/146.5 |
| 2009/0230722 | A1 | * | 9/2009 | Krajenke .............. E05D 15/101 296/146.5 |
| 2009/0230724 | A1 | | 9/2009 | Fischer et al. |
| 2009/0267383 | A1 | * | 10/2009 | Fischer .................... B60J 5/06 296/155 |
| 2011/0146161 | A1 | | 6/2011 | Heuel et al. |
| 2012/0031004 | A1 | | 2/2012 | Boettcher |

FOREIGN PATENT DOCUMENTS

| | | | | |
|---|---|---|---|---|
| EP | 0100455 | A1 | | 2/1984 |
| EP | 0612637 | A1 | | 8/1994 |
| EP | 1681425 | A2 * | 7/2006 | ......... E05D 15/0626 |
| EP | 1705327 | A2 * | 9/2006 | ......... E05D 15/0652 |
| GB | 1201447 | A * | 8/1970 | ................ B60J 5/06 |
| GB | 1458939 | A | | 12/1976 |
| GB | 2550890 | A * | 12/2017 | |
| WO | WO-2011078598 | A2 * | 6/2011 | ............ E05F 15/652 |

* cited by examiner

CENTER TRACK DESIGN FOR A SLIDING DOOR

CROSS-REFERENCE TO RELATED APPLICATION

This application claims priority to EP 16152857.5, filed on Jan. 27, 2016, the entire contents of which are hereby incorporated herein by reference.

FIELD OF THE INVENTION

The present invention relates in general to a vehicle comprising a sliding door. More in particular, the present invention relates to a particular center track design for guiding a sliding door of a vehicle.

BACKGROUND OF THE INVENTION

The present invention is generally related to a mounting technique of sliding doors of vehicles such as for example a sliding door of a van or minivan. Vehicles with sliding doors and mechanism for mounting such doors are known in the art.

DE 24 48 462 B1 (also published as GB1458939A) describes a sliding door with a central guide rail, where the path of movement of the sliding door is substantially straight and directed outwardly.

DE 101 30 313 A1 (also published as U.S. Pat. No. 6,328,374B1) shows a very complex mounting system with a bottom track, a top track and a central track.

DE 10 2009 011 859 A1 (also published as US2009230724A1) shows a vehicle sliding door mounted to a primary and secondary track via a door bracket which is pivotally mounted to be oriented in parallel to the vehicle.

DE 10 2009 058 583 A1 describes a sliding door having a guide rail, where a sliding carriage is mounted longitudinally on the guide rail. The sliding carriage is connected to a vehicle body through multiple joints. A guide track unit is formed by two guide tracks, where the latter guide track is pre-stressed opposite the former guide track in an elastic manner.

DE 60 2004 001 423 T2 (also published as US2011146161A1) describes a sliding door for a vehicle including a guide rail, a sliding carriage and a guide pin.

EP 0 612 637 A1 describes a sliding door for a driver's cab of a lorry, which door is mounted and guided by means of two vehicle-side guide rails and door-side rolling and sliding elements which run therein and exclusively guided by means of one guide rail arranged on the outside of the vehicle.

SUMMARY OF THE INVENTION

The present concept has the object to reduce or eliminate the risk of interference between an interior trim of a sliding door of a vehicle and a rear wheel opening molding of that vehicle.

It is a particular object of the present concept to increase the spacing between the exterior rear wheel opening molding and the woodstock trim of a sliding door of a vehicle.

It should be noted that the individual features listed in the description below can be combined in any technically meaningful way with each other and show further embodiments of the invention. The description of the present concept is additionally characterized and specified particularly in connection with the figures.

According to one embodiment of the present invention, a vehicle is disclosed comprising a center track fixedly mounted to the vehicle for guiding a sliding door; the sliding door being movably mounted to the center track such that the sliding door can move between an open position and a closed position, characterized in that the vehicle further comprises a wedge shaped support part comprising a first zone having a constant thickness along the length of the first zone, and a second zone having a monotonically decreasing thickness along the length of the second zone; the center track comprising a first zone, and a second zone, and a third zone, each of the first, second and third zones being substantially straight or completely straight, the center track further comprising a first bend between the first and the second zone defining a first angle, and a second bend between the second and third zone defining a second angle, the first angle being an angle in the range from 160° to 178°, the second angle being an angle in the range from 182° to 200°; the support part being mounted between an outer rear surface of the vehicle and the center track in such a way that the first zone of the center track is mounted to the first zone of the support part and the second zone of the center track is mounted to the second zone of the support part and the third zone of the center track is directly mounted to the outer rear surface of the vehicle.

It is an advantage of using a support part because it provides an outward movement of the sliding door to avoid interference with a rear portion of the vehicle.

It is an advantage of using a wedge shaped support part because it provides a gradual increase of the distance between the sliding door and the rear portion of the vehicle, thus allowing a smooth movement of the sliding door when opening or closing the sliding door.

It is an advantage of adding the wedge shaped support part between the rear surface of the vehicle and the center track, as compared to mounting the center track to the rear surface directly, because it allows the distance between an interior trim of the sliding door and a rear wheel opening molding of the vehicle to be increased by the thickness of the support art. In this way the risk of interference or contact between the sliding door and the rear surface of the vehicle is decreased or even completely eliminated.

It is an advantage of providing a wedge shaped support part comprising or consisting of two zones, the first zone having a constant thickness, the second zone having a monotonically decreasing thickness, because such a support part can be easily manufactured and because existing sliding doors can be used without any modification to the door itself, at most another mounting bracket or mounting arm needs to be provided.

It is an advantage that center tracks according to the present invention can be produced using existing production equipment and production methods, with minor modifications, namely the mere addition of two bending steps.

It is an advantage of choosing angles in the indicated ranges, the angles being measured on the side of the vehicle, because the movement of the sliding door is not hindered and because the outer movement is barely noticeable, yet, the angles are chosen so as to provide sufficient space between the rear surface of the vehicle and the interior trim of the sliding door.

It is an advantage that the support part consists of two zones, and the center track comprises three zones, amongst which two zones having a shape complementary to the shape of the support part. This allows for a firm and aesthetic assembly of the support part and the center track.

According to an advantageous embodiment of the present invention, the first angle may be an angle in the range from about 170° to about 178° or about 165° to about 175°, and the second angle may be an angle in the range from about 185° to about 190°.

It is an advantage of choosing such angles because the sliding door will slide even more smoothly when being opened or closed.

According to a further advantageous embodiment of the present invention, the first and second angles are chosen such that a sum of the first angle and the second angle is a value in the range from about 350° to about 370°, preferably in the range from about 355° to about 365°.

It is an advantage of choosing angles having a sum in this range, because the first and second angles largely compensate each other, such that the first zone and third zone are substantially parallel.

According to a further advantageous embodiment of the present invention, the length of the first zone is at least 25 cm, and a length of the second zone is at least 10 cm, and a length of the third zone is at least 25 cm.

It is an advantage of choosing the zones sufficiently long in order to avoid sudden abrupt movements when opening or closing the sliding door.

According to a further advantageous embodiment of the present invention, the thickness of the support part in the first zone is a value in the range from 2 mm to 50 mm, preferably in the range from 5 mm to 30 mm.

According to a further advantageous embodiment of the present invention, the thickness of the support part in the second zone decreases linearly from the width of the first thickness to 0 mm.

In an advantageous embodiment, the present invention also discloses a kit of parts comprising: the center track and the wedge shaped support part, suitable for use in a vehicle according to any embodiment or combination thereof as described above for mounting a sliding door thereof.

These and other aspects, objects, and features of the present invention will be understood and appreciated by those skilled in the art upon studying the following specification, claims, and appended drawings.

BRIEF DESCRIPTION OF THE DRAWINGS

Further features and advantages of the present invention will become apparent from the following description of a non-limiting embodiment of the invention which will be explained below with reference to the drawings, whereby.

DETAILED DESCRIPTION OF THE PREFERRED EMBODIMENTS

Figure 1:
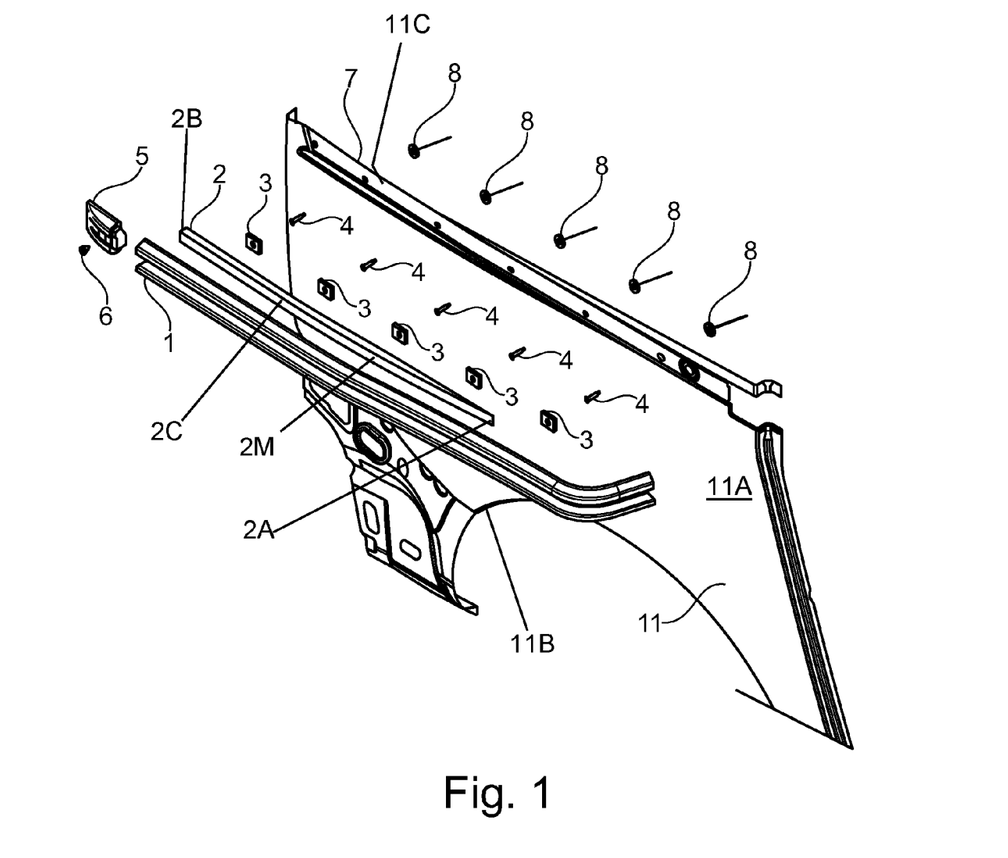
FIG. 1 is an exploded top perspective view of a center track and a center track support part according to an embodiment of the present invention, as well as elements for mounting the support part and center track to the rear side of a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is generally related to vehicles having a sliding door.

Figure 4:
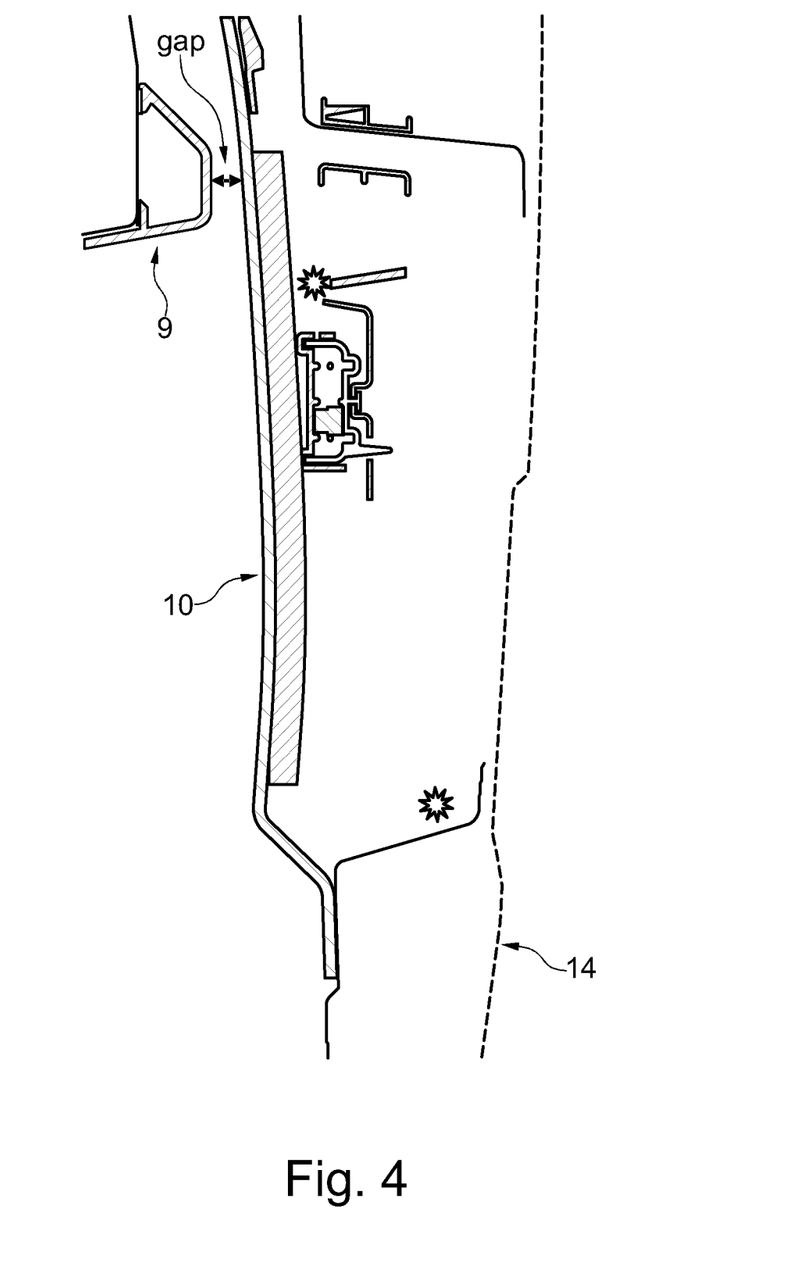
FIG. 4 is a cross sectional view of an exemplary sliding door in its open position, taken in a plane perpendicular to a first zone of a center track, the figure showing a gap between a rear wheel opening molding and an interior trim of the sliding door.

A problem of some existing sliding doors is that the interior trim, e.g. woodstock trim of the sliding door, has interference with an exterior rear wheel opening molding, especially for 18 inch wheel vehicles, as is shown in FIG. 4.

According to an embodiment of the present invention, an elegant and simple solution is provided to move the sliding door more outward with respect to the body side of the vehicle. However, instead of completely redesigning the vehicle and/or the mounting system and/or the sliding door shape and dimensions, the present invention provides for a solution that is easy to produce and requires only a minimal amount of changes to the vehicle and/or to the sliding mechanism and/or to the sliding door itself.

Surprisingly, providing two bends in the center track 1 (FIG. 1) and to provide a support part 2 solves the problem described above and will now be described in more detail.

Referring now to FIG. 1, a rear portion of a vehicle configured to include a sliding door on an exterior wall 11 thereof is shown. In the prior art the center track is mounted directly to an outer surface of the vehicle. It was found however that such mounting cause problems with some vehicles in the sense that an interior wall of the sliding door, for example a woodstock trim of the sliding door, comes into contact with a portion of the outer surface of the vehicle, causing interference therebetween. In order to avoid this interference, a solution to move the sliding door further away from the outside surface of the vehicle, especially at the location of the rear wheel is needed. As illustrated in the sliding door mounting system of FIG. 1, a support part 2 is disposed between the outer surface 11A of the exterior wall 11 of the vehicle and the center track 1. The support part 2 extends over a portion of the length of the center track 1, and extends over a length of a rear wheel well 11B disposed on the exterior wall 11 of the vehicle. The support part 2 is a wedge-shaped support part having a body portion 2C with a first end 2A and a second end 2B. As shown in FIG. 1, the body portion 2C of the support part 2 widens from the first end 2A to the second end 2B to provide the wedge-shaped configuration. In addition, the center track 1 itself includes two bends 12, 13, for moving the center track 1 outwardly away from the vehicle. This will be explained in more detail when describing FIG. 3A. The center track 1 shown in FIG. 1 is a substantially linear member that can be mounted to the exterior wall 11 of the vehicle by means of washers 3 and bolts 4 and nuts 8 to the body side 7 of the vehicle. Optionally, at the end, a bumper 5 can be installed using a fastener 6. As shown in FIG. 1, the center track 1 is not mounted directly to the vehicle over its entire length as found in the prior art. Instead, the center track support part 2 is arranged between a portion of the center track 1 and the outer surface 11A of the exterior wall 11 of the vehicle. FIG. 1 is an exploded view showing the relative position of the center track 1 and the center track support part 2 and the rear wheel well 11B. As further shown in FIG. 1, the support part 2 can be mounted to and received in an inset channel 11C disposed on the exterior wall 11 of the vehicle.

Figure 2:
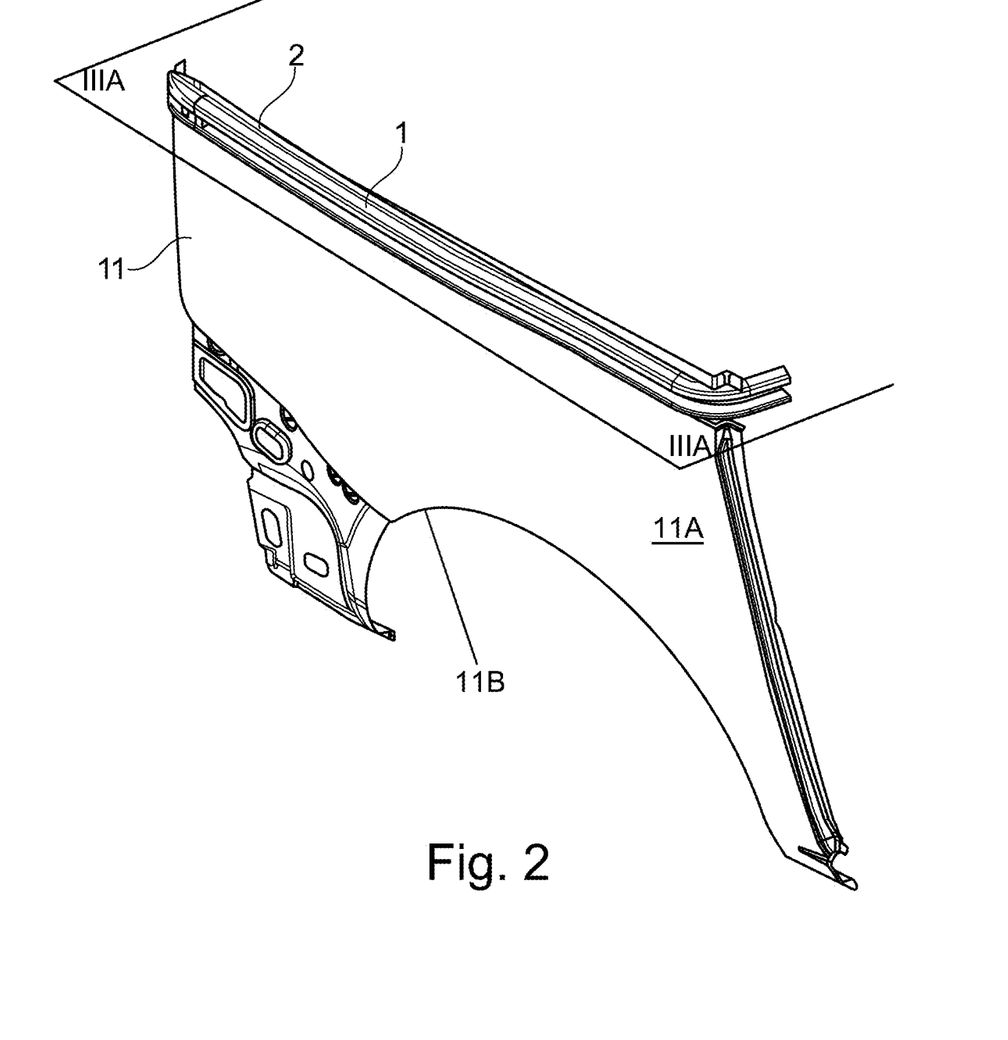
FIG. 2 is a perspective view of the center track and the center track support part of FIG. 1 mounted to a rear side of a vehicle.

FIG. 2 shows the center track 1 and a center track support part 2 of the present invention mounted to a rear side of a vehicle.

Figures 3A, 3B:
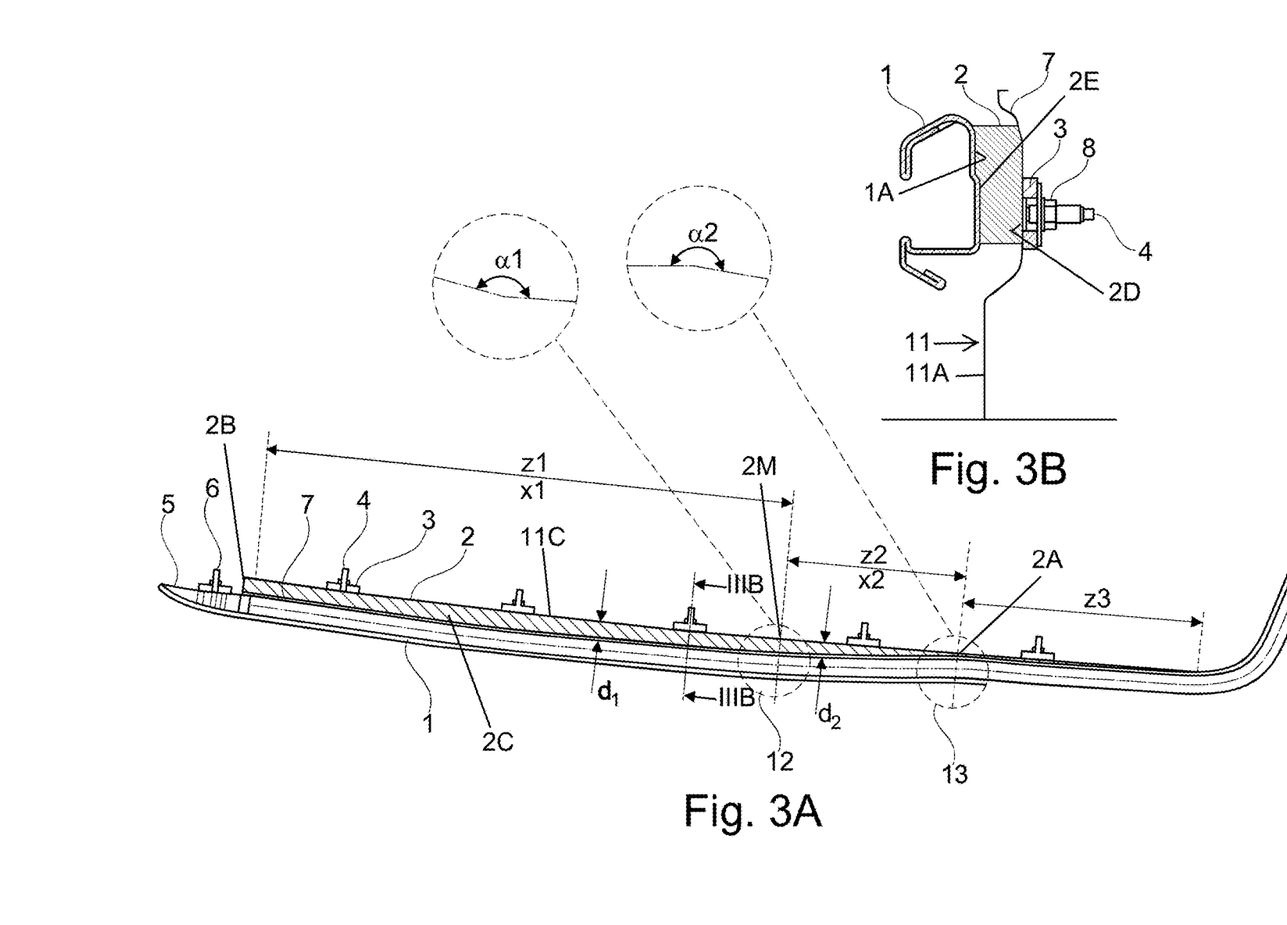
FIG. 3A is a cross-sectional view of FIG. 2 in the plane B-B.
FIG. 3B is a cross-sectional view of FIG. 3A in the plane A-A.

FIG. 3A is a cross-sectional view of FIG. 2 in the plane B-B. It shows that the center track support part 2 has a first zone x1 and a second zone x2 separated by an intermediary point 2M. The first zone x1 has a first thickness d1 in the range of 5 mm to 50 mm, for example 25 mm from second end 2B to intermediary point 2M. The second zone x2 has a thickness which decreases from the intermediary point 2M towards the first end 2A of the support part 2. The first thickness d1 is contemplated to be a constant thickness over a length of the first zone x1 of the support part 2. The center track 1 comprises three zones: a first zone z1 mounted to the first zone x1 of the support part 2, a second zone z2 mounted to the second zone x2 of the support part, and a third zone z3 directly mounted to the outer surface 11A of the exterior wall 11 of the vehicle.

The center track 1 has a first bend 12 between the first zone z1 and the second zone z2, defining an angle $\alpha 1$ in the range of 160° to 178°, e.g. about 170°, and a second bend 13 between the second zone z2 and the third zone z3, defining an angle $\alpha 2$ in the range of 182° to 200°, e.g. about 190°. Thus, the first bend 12 defines an obtuse angle, and the second bend 13 defines a reflex angle. As can be seen from FIG. 1, the first zone z1 and the third zone z3 of the center track 1 are substantially parallel to the outer surface 11A of the exterior wall 11 of the vehicle, while the second zone z2 shows an angle, e.g. about 10° with respect to the outer surface 11A of the exterior wall 11 of the vehicle. Thus, the first bend 12 and the second bend 13 position the second zone z2 of the center track 1 at an outwardly extending angle away from the exterior wall 11 of the vehicle. This causes a sliding door mounted to the center track 1, when moving to the rear of the vehicle and thus being opened, to be moved further outwardly with respect to the vehicle than is the case in the prior art, without the support part 2. In this way, a gap is created between the sliding door and the exterior rear wheel opening molding 9 (FIG. 4).

By choosing appropriate lengths for each zone z1, z2, and z3, and by choosing appropriate angles for the bends 12, 13 between the three zones of the center track 1, smooth movement of a sliding door coupled to the center track 1 is not negatively influenced. The shape of the support part 2 is deliberately chosen so that it can be easily produced at a limited cost increase. By choosing an appropriate material for the support part 2, such as for example aluminum or plastic material, an elegant and robust, yet aesthetic solution can be provided.

FIG. 3B is a cross-sectional view of FIG. 3A along line A-A. It can be seen that at this position (in the first zone z1) the center track 1 is not directly mounted to the body side 7, but a center track support part 2 (at the first zone x1) is mounted in between to create an additional distance d1. As can be seen from FIG. 3A this distance gradually decreases in the second zones z2, x2 of the center track 1 and the support part (respectively) (in the direction of the front of the vehicle), and is zero in the third zone z3 of the center track 1. Thus, the second thickness d2 is a monotonically decreasing thickness along a length of the second zone x2 of the support port 2. The first end 2A of the support part 2 further defines a first end of the second zone x2 of the support part 2. Further, the intermediary point 2M of the support part 2 defines a second end of the second zone x2 of the support part 2. Thus, it can be said that the support part 2 has a second thickness that linearly increases from the first end 2A of the second zone x2 to the second end 2M of the second zone x2.

As further shown in FIG. 3B, the support part 2 includes inner and outer surfaces 2D, 2E, wherein the inner surface 2D is mounted to the exterior surface 11A of exterior wall 11 of the vehicle. The center track 1 includes an inner surface 1A which is mounted to the exterior surface 2E of the support part 2.

FIG. 4 is a cross sectional view of an exemplary sliding door 14 when in its open position, taken in a plane perpendicular to the first zone z1 of center track 1. The sliding door 14 is mounted using the center track 1 and center track support part 2 of the present invention (although not explicitly shown in FIG. 4). The actual mounting of the sliding door 14 to the central track 1 can be done in manners known in the art, for example using an arm connected to the sliding door 14 and movably arranged inside the center track 1, but since such mounting techniques are known in the art, it need not be described in more detail here. Any suitable prior art mounting technique can be used. What is important to mention is that FIG. 4 shows a gap between the rear wheel opening molding 9 and an interior trim article 10 of the sliding door 14, for example a woodstock trim. Thanks to this gap, interference between the interior trim article 10 and an exterior wall 11A of the vehicle is avoided.

Figure 5:
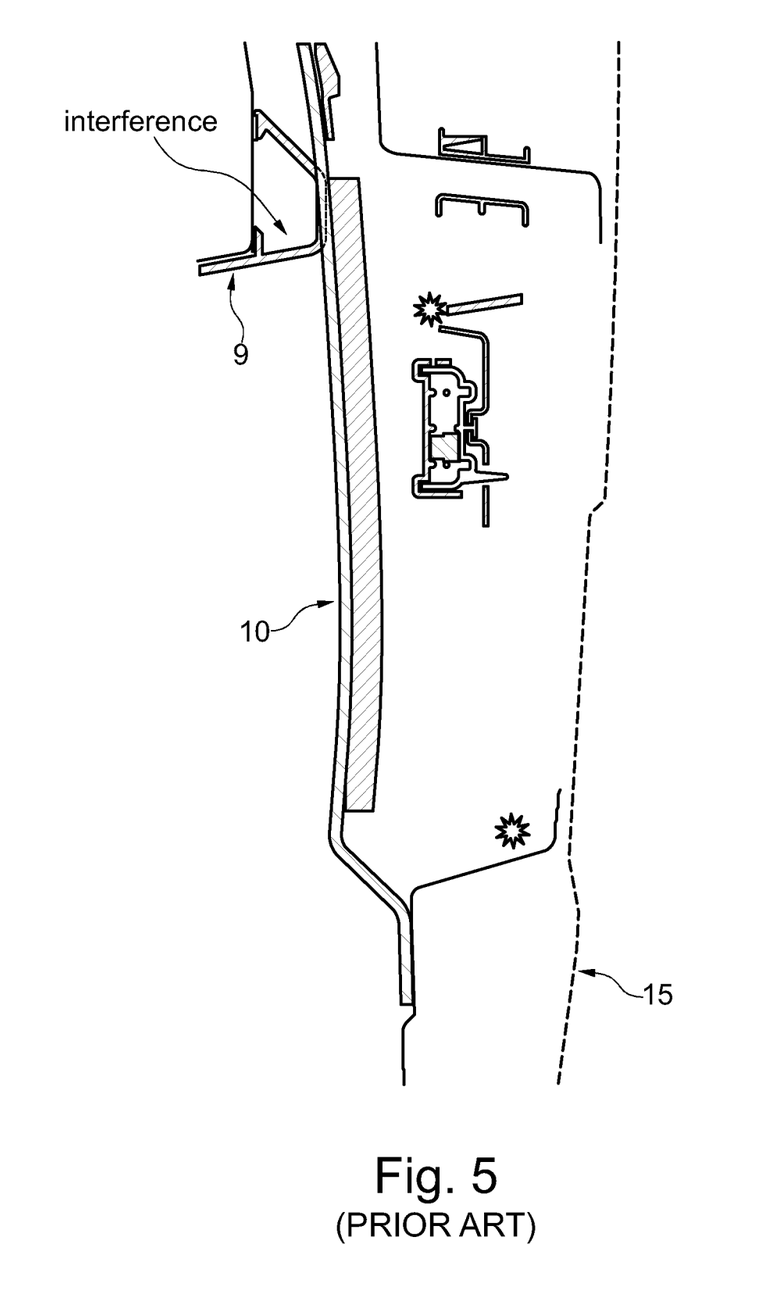
FIG. 5 is a cross sectional view of the sliding door of FIG. 4 in its open position, the sliding door being mounted using a prior art center track (without a support part), the figure showing interference between the rear wheel opening molding and the interior trim of the sliding door.

FIG. 5 is a cross sectional view of a sliding door 15 of a prior art vehicle, when in its open position. The sliding door 15 is identical or largely similar to the sliding door 14 of FIG. 4, but the sliding door 15 is mounted using a prior art center track 1 not having bends 12, 13, and without making use of the center track support part 2. As can be seen, FIG. 5 shows interference between the rear wheel opening molding and the interior trim article 10 of the sliding door 15.

It will be appreciated by those skilled in the art that although the disclosure has been described by way of example with reference to one or more arrangements, it is not limited to the disclosed arrangements and that alternative arrangements could be constructed without departing from the scope of the invention as defined by the appended claims.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A sliding door mounting system for a vehicle, comprising:
a center track member having a first zone, a second zone, and a third zone, wherein the center track member further includes a first bend defining a first angle between the first zone and the second zone, and a second bend defining a second angle between the second zone and the third zone, wherein the first angle is an angle in a range from about 160° to about 178°, further wherein the second angle is an angle in a range from about 182° to about 200°; and
a support part having a wedge-shaped body portion with an inner surface and an outer surface, wherein the body portion is coupled to an exterior wall of the vehicle at the inner surface thereof, and further wherein an inner surface of the center track member is coupled to the outer surface of the body portion of the support part, wherein the body portion includes a first zone having a first thickness, and a second zone having a monotonically decreasing second thickness along a length of the second zone, wherein the first zone and the second zone of the center track member are aligned with the first zone and the second zone of the support part, respectively, as mounted to one another.

2. The sliding door mounting system of claim 1, wherein the first angle is an angle in a range from about 165° to about 175°, and further wherein the second angle is an angle in a range from about 185° to about 190°.

3. The sliding door mounting system of claim 2, wherein the first angle and the second angle are chosen such that a sum of the first angle and the second angle is a value in a range from about 350° to about 370°.

4. The sliding door mounting system of claim 3, wherein the first angle and the second angle are chosen such that a sum of the first angle and the second angle is a value in a range from about 355° to about 365°.

5. The sliding door mounting system of claim 1, wherein the first zone of the center track member includes a length of at least 25 cm, further wherein the third zone of the center track member includes a length of at least 25 cm.

6. The sliding door mounting system of claim 5, wherein the second zone of the center track member includes a length of at least 10 cm.

7. The sliding door mounting system of claim 1, wherein the first thickness of the support part in the first zone thereof includes a width in a range from about 2 mm to about 50 mm.

8. The sliding door mounting system of claim 7, wherein the width is in a range from about 5 mm to about 30 mm.

9. The sliding door mounting system of claim 1, wherein the second thickness of the support part in the second zone thereof decreases linearly from a width of the first thickness to 0 mm.

10. A sliding door mounting system for a vehicle, comprising:
a center track member configured to support a sliding door between open and closed positions, wherein the center track member is a linear member having a first zone and a second zone with a first bend disposed therebetween at a first angle, the center track member further includes a third zone and a second bend disposed between the second zone and the third zone at a second angle, wherein the second angle of the second bend is greater than the first angle of the first bend; and
a support part having a first zone and a second zone, wherein a portion of the center track member is coupled to an outer surface of the support part, wherein the first zone of the support part includes a first thickness, and further wherein the second zone of the support part includes a second thickness disposed between a first end and a second end of the second zone, wherein the second thickness of the second zone increases from the first end to the second end of the second zone, and further wherein the first zone of the center track member is coupled to the first zone of the support part which is further coupled to an exterior wall of the vehicle.

11. The sliding door mounting system of claim 10, wherein the exterior wall of the vehicle includes an inset channel, and further wherein the support part is received in the inset channel.

12. The sliding door mounting system of claim 10, wherein the exterior wall of the vehicle includes a wheel well having a length.

13. The sliding door mounting system of claim 12, wherein the support part is mounted to the exterior wall of the vehicle over the length of the wheel well.

14. The sliding door mounting system of claim 10, wherein the first thickness of the support part is a constant thickness along a length of the first zone of the support part.

15. The sliding door mounting system of claim 10, wherein the third zone of the center track is directly mounted to the exterior wall of the vehicle.

16. The sliding door mounting system of claim 15, wherein the first bend and the second bend position the second zone of the center track member at an outwardly extending angle away from the exterior wall of the vehicle.

17. A sliding door mounting system for a vehicle, comprising:
- a center track member configured to support a sliding door between open and closed positions, the center track member having a first zone, a second zone, and a third zone, wherein the center track member further includes a first bend at an obtuse angle between the first zone and the second zone, and a second bend at a reflex angle between the second zone and the third zone; and
- a support part having a wedge-shaped body portion mounted between an exterior wall of the vehicle and the center track member, wherein the body portion of the support part includes a first zone having a first thickness, and a second zone having second thickness that is less than the first thickness, wherein the first zone and the second zone of the center track member are aligned with the first zone and the second zone of the support part, respectively, in assembly.

18. The sliding door mounting system of claim 17, wherein the obtuse angle is an angle in a range from about 160° to about 178°, further wherein the reflex angle is an angle in a range from about 182° to about 200°.

19. The sliding door mounting system of claim 18, wherein a width of the first thickness is in a range from about 5 mm to about 30 mm.

20. The sliding door mounting system of claim 19, wherein the second thickness of the support part in the second zone thereof decreases linearly from the width of the first thickness to 0 mm.

* * * * *